United States Patent
Okamura et al.

(10) Patent No.: US 11,011,767 B2
(45) Date of Patent: May 18, 2021

(54) FUEL CELL SYSTEM AND METHOD OF CONTROLLING FUEL CELL SYSTEM

(71) Applicant: HONDA MOTOR CO., LTD., Tokyo (JP)

(72) Inventors: Yuji Okamura, Wako (JP); Tetsuya Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 16/192,893

(22) Filed: Nov. 16, 2018

(65) Prior Publication Data

US 2019/0157695 A1    May 23, 2019

(30) Foreign Application Priority Data

Nov. 22, 2017    (JP) .............. JP2017-224132

(51) Int. Cl.
*H01M 8/04828*    (2016.01)
*H01M 8/0432*    (2016.01)
(Continued)

(52) U.S. Cl.
CPC ... *H01M 8/04828* (2013.01); *H01M 8/04007* (2013.01); *H01M 8/0432* (2013.01); *H01M 8/04037* (2013.01); *H01M 8/04067* (2013.01); *H01M 8/04156* (2013.01); *H01M 8/04164* (2013.01); *H01M 8/04365* (2013.01); *H01M 8/04373* (2013.01); *H01M 8/04492* (2013.01); *H01M 8/04731* (2013.01); *H01M 8/04738* (2013.01)

(58) Field of Classification Search
CPC ........... H01M 8/04828; H01M 8/0432; H01M 8/04007; H01M 8/04164; H01M 8/04731; H01M 8/04365; H01M 8/04373; H01M 8/04156; H01M 8/04037; H01M 8/04738; H01M 8/04067; H01M 8/04492; Y02E 60/50

See application file for complete search history.

(56) References Cited

U.S. PATENT DOCUMENTS

| 2010/0035107 A1* | 2/2010 | Kanie ............... H01M 8/04649 429/431 |
| 2010/0227238 A1* | 9/2010 | Naganuma ........ H01M 8/04253 429/429 |

(Continued)

FOREIGN PATENT DOCUMENTS

| JP | 2005-011779 | 1/2005 |
| JP | 2012-219276 | 11/2012 |
| JP | 2014-080634 | 5/2014 |

OTHER PUBLICATIONS

English machine translation of JP2012-219276 (Year: 2012).*

*Primary Examiner* — Lisa S Park
(74) *Attorney, Agent, or Firm* — Amin, Turocy & Watson, LLP

(57) ABSTRACT

In a fuel cell system and a method of controlling the fuel cell system, correlation temperature correlated to temperature of a fuel cell stack is obtained. Further, temperature of a heating unit provided at the bottom of a water storage area of a gas liquid separator is estimated. The presence/absence of water in the gas liquid separator is determined based on the correlation temperature of the fuel cell stack and the temperature of the heating unit.

7 Claims, 10 Drawing Sheets

(51) Int. Cl.
  *H01M 8/04492* (2016.01)
  *H01M 8/04007* (2016.01)
  *H01M 8/04701* (2016.01)
  *H01M 8/04119* (2016.01)

(56) References Cited

U.S. PATENT DOCUMENTS

2010/0261079 A1* 10/2010 Kells .................. H01M 8/0267
 429/429
2012/0298520 A1* 11/2012 Takeuchi ................ C25B 15/08
 205/335
2014/0178779 A1* 6/2014 Baur .................. H01M 8/04156
 429/413

* cited by examiner

FUEL CELL SYSTEM AND METHOD OF CONTROLLING FUEL CELL SYSTEM

CROSS-REFERENCE TO RELATED APPLICATION

This application is based upon and claims the benefit of priority from Japanese Patent Application No. 2017-224132 filed on Nov. 22, 2017, the contents of which are incorporated herein by reference.

BACKGROUND OF THE INVENTION

Field of the Invention

The present invention relates to a fuel cell system including a gas liquid separator and a method of controlling the fuel cell system.

Description of the Related Art

Japanese Laid-Open Patent Publication No. 2005-011779 has an object of providing a fuel cell system which does not require time for warming up to defrost devices at the time of starting operation of the fuel cell system (paragraph and Abstract). In order to achieve the above object, the fuel cell system of Japanese Laid-Open Patent Publication No. 2005-011779 (Abstract) includes a gas supply/discharge part. When a fuel cell is operated, a gas containing water vapor passes through the gas supply/discharge part. Further, the fuel cell system includes heating means and heating control means. The heating means heats at least one of a position of the gas supply/discharge part. At the time of stopping operation of the fuel cell, the heating control heats the gas supply/discharge part for a predetermined period using the heating means.

According to the disclosure, the above configuration offers the following working effects and advantages (paragraph [0006]). Specifically, by cooling the water vapor contained in the gas flowing through the system, water attached to a portion related to supply/discharge of the gas is evaporated by heating at the time of stopping operation of the fuel cell. Therefore, at the time of stopping operation of the fuel cell system, even if the fuel cell system is cooled by the outside air, it is possible to avoid operation failures due to freezing of the portion related to supply/discharge of the heated gas. Further, at the time of starting operation of the fuel cell system, since there is no need to carry out the process of defrosting the frozen portion, it is possible to reduce the time required for starting operation of the fuel cell system.

SUMMARY OF THE INVENTION

As described above, in Japanese Laid-Open Patent Publication No. 2005-011779, at the time of stopping operation of the fuel cell, water is evaporated by heating the gas supply/discharge section for a predetermined period of time (Abstract). However, there is room for improvement in respect of detecting or discharging water in the fuel cell system.

The present invention has been made taking the above problem into account, and an object of the present invention is to provide a fuel cell system which makes it possible to detect or discharge water in a fuel cell system suitably, and provide a method of controlling the fuel cell system.

A fuel cell system according to the present invention includes a fuel cell stack, a fuel gas supply unit configured to supply a fuel gas to the fuel cell stack, an oxygen-containing gas supply unit configured to supply an oxygen-containing gas to the fuel cell stack, a gas liquid separator provided at least in one of the fuel gas supply unit and the oxygen-containing gas supply unit, a fuel cell stack correlation temperature acquisition unit configured to obtain correlation temperature correlated to temperature of the fuel cell stack, a heating unit provided at a bottom of a water storage area of the gas liquid separator, a heating unit temperature estimation unit configured to estimate temperature of the heating unit, and a control unit configured to determine presence/absence of water in the gas liquid separator based on the correlation temperature of the fuel cell stack and the temperature of the heating unit.

In the present invention, the presence/absence of water in the gas liquid separator is determined based on the correlation temperature of the fuel cell stack and the temperature of the heating unit. Therefore, it becomes possible to recognize the presence of the water in the gas liquid separator using the simple system, without requiring additional component parts such as a water level sensor. Otherwise, also in the case where additional component parts such as a water level sensor is provided, by applying the present invention, it becomes possible to obtain the advantage in respect of a fail-safe feature. Therefore, it becomes possible to suitably detect or discharge the water in the fuel cell system.

The control unit may be configured to perform heating control using the heating unit at time of starting operation at low temperature, and control heating quantity of the heating unit based on a determination result regarding the presence/absence of the water. In this manner, by suitably performing heating control at the time of starting operation at low temperature, it becomes possible to suppress clogging due to freezing of the water.

The gas liquid separator may include a drain valve configured to discharge water stored in the water storage area. Further, the control unit may be configured to perform water discharge control by driving the drain valve based on a determination result regarding the presence/absence of the water. In this manner, with simple configuration, it becomes possible to perform water discharge control in the gas liquid separator.

The control unit may be configured to determine whether water discharge has been performed normally based on temperature change of the heating unit during the water discharge control. The temperature change of the heating unit is monitored to determine whether or not water discharge has been completed. In this manner, it becomes possible to realize the water discharge control with simple configuration at low cost.

The control unit may be configured to determine that water discharge has been performed normally when the temperature of the heating unit is changed by a predetermined value or more, relative to the correlation temperature of the fuel cell stack. Since whether or not water discharge has been performed by the heating unit is determined based on the correlation temperature of the fuel cell stack having large heat mass, it becomes possible to make a water discharge determination suitably in accordance with the system operating condition.

After the control unit determines that water discharge has been performed normally, the control unit may be configured to determine that remaining water is present in the gas liquid separator when temperature of the heating unit is changed by less than a predetermined value, relative to the correlation temperature of the fuel cell stack, and perform water discharge control again. Due to inclination of the vehicle, even though water discharge has not been performed normally, it may be determined erroneously that the water discharge has been completed. In the embodiment of the present invention, in the case where inclination state of the vehicle is eliminated and the remaining water is recognized, since the water discharge control is performed again, it becomes possible to reliably suppress clogging due to freezing.

In a method of controlling a fuel cell system according to the present invention, the fuel cell system includes a fuel cell stack, a fuel gas supply unit configured to supply a fuel gas to the fuel cell stack, an oxygen-containing gas supply unit configured to supply an oxygen-containing gas to the fuel cell stack, a gas liquid separator provided at least in one of the fuel gas supply unit and the oxygen-containing gas supply unit, a fuel cell stack correlation temperature acquisition unit configured to obtain correlation temperature correlated to temperature of the fuel cell stack, a heating unit provided at a bottom of a water storage area of the gas liquid separator, and a heating unit temperature estimation unit configured to estimate temperature of the heating unit. The method includes the step of determining presence/absence of water in the gas liquid separator based on the correlation temperature of the fuel cell stack and the temperature of the heating unit by a control unit.

In the present invention, it becomes possible to detect or discharge water in the fuel cell system suitably.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. Embodiment

<A-1. Configuration>
[A-1-1. Overall Configuration>

Figure 1:
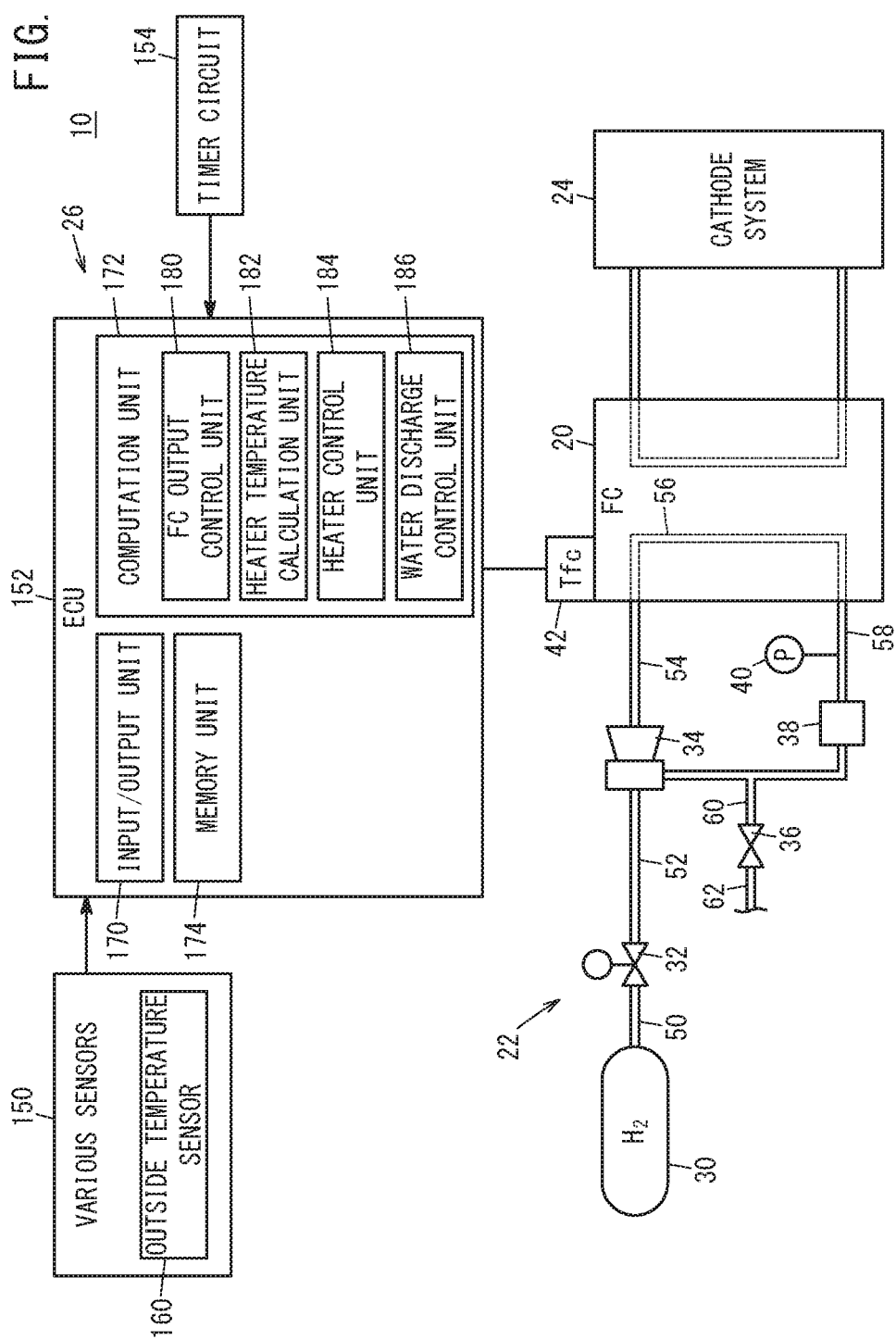
FIG. 1 is a block diagram showing a fuel cell system (hereinafter also referred to as the "FC system") according to one embodiment of the present invention.
Figure 2:
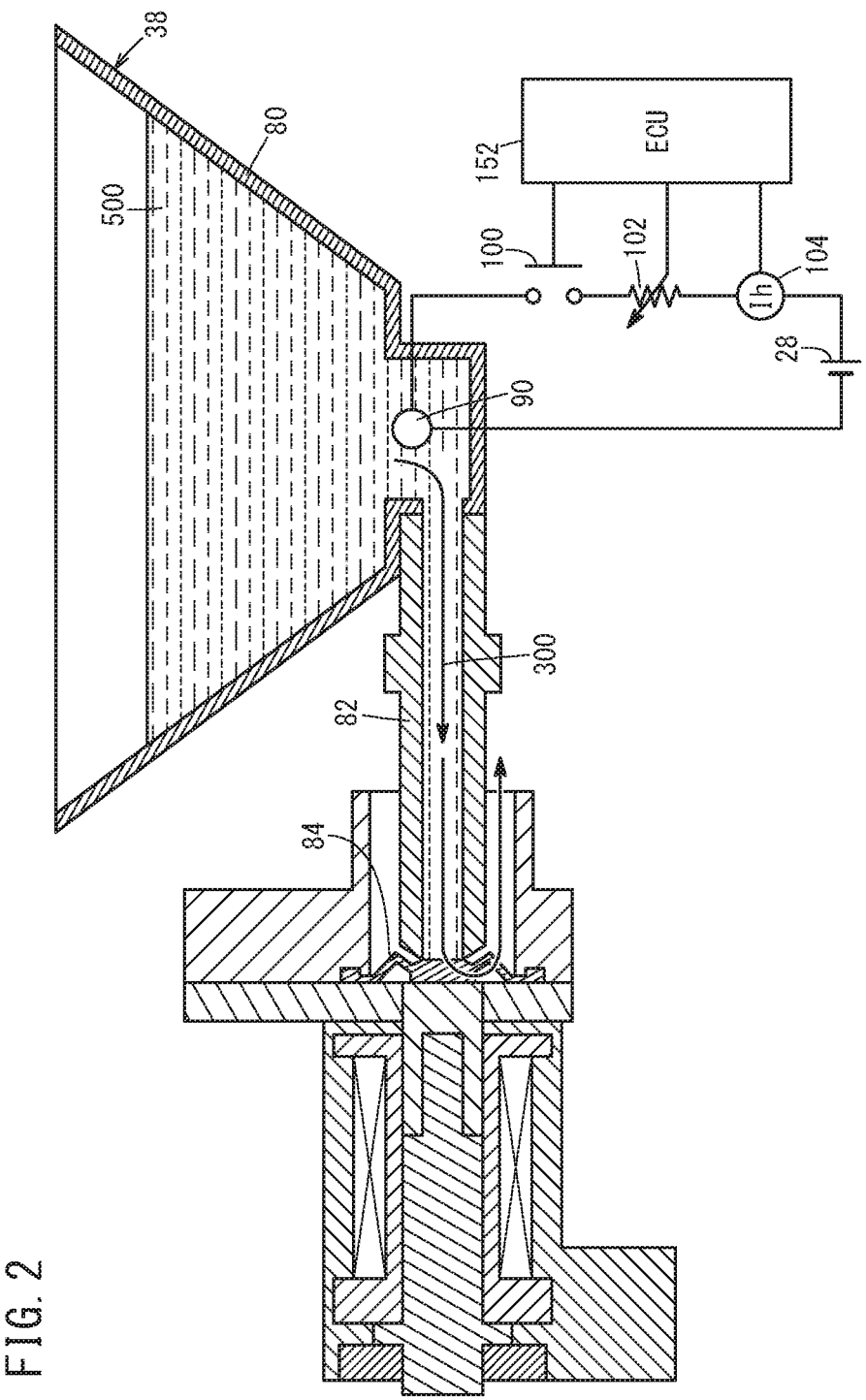
FIG. 2 is a view schematically showing a gas liquid separator according to the embodiment and a peripheral area around the gas liquid separator.

FIG. 1 is a block diagram showing a fuel cell system 10 (hereinafter also referred to as the "FC system 10" according to one embodiment of the present invention. Though the FC system 10 according to the embodiment is used in a vehicle, the FC system 10 may be used in other applications. The FC system 10 includes a fuel cell stack 20 (hereinafter referred to as the "FC stack 20" or the "FC 20"), an anode system 22, a cathode system 24, a control system 26, and a battery 28 (FIG. 2).

For example, the FC stack 20 has structure formed by stacking fuel cells each formed by providing a solid polymer electrolyte between an anode and a cathode. The anode system 22 supplies a hydrogen gas to the FC 20. The cathode system 24 supplies an oxygen-containing gas to the FC 20. The control system 26 controls the FC 20, the anode system 22, and the cathode system 24.

For example, the cathode system 24 (oxygen-containing gas supply unit) may have the same configuration as that of Japanese Patent Publication No. 2012-219276 or Japanese Laid-Open Patent Publication No. 2014-080634.

[A-1-2. Anode System 22]
(A-1-2-1. Overview)

As shown in FIG. 1, the anode system 22 (fuel gas supply unit) includes a hydrogen tank 30, a regulator 32, an injector 34, a purge valve 36, a gas liquid separator 38, a pressure sensor 40, and a fuel cell temperature sensor 42 (hereinafter also referred to as the "FC temperature sensor 42"). The hydrogen tank 30 stores hydrogen as a fuel gas. The hydrogen tank 30 is connected to an inlet of an anode channel 56 through a pipe 50, the regulator 32, a pipe 52, the injector 34, and a pipe 54. Therefore, hydrogen in the hydrogen tank 30 can be supplied to the anode channel 56 through the pipe 50, etc. It should be noted that an interruption valve (not shown) is provided for the pipe 50, and at the time of performing power generation in the FC stack 20, the interruption valve is opened by an electronic control device 152 of the control system 26. The regulator 32 regulates the pressure of the supplied hydrogen to a predetermined value, and discharges the hydrogen having the regulated pressure.

The injector 34 generates negative pressure by injecting the hydrogen from the hydrogen tank 30 through a nozzle, and sucks the anode off gas from a pipe 58 by this negative pressure.

The outlet of the anode channel 56 is connected to an air intake port of the injector 34 through the pipe 58. Then, the anode off gas discharged from the anode channel 56 passes through the pipe 58, and flows again into the pipe 54. In this manner, the anode off gas (hydrogen) is circulated. It should be noted that the anode off gas contains hydrogen which has not been consumed in the electrode reaction at the anode, and water vapor.

The gas liquid separator 38 is provided for the pipe 58, and separates/collects water {condensed water (liquid) and water vapor (gas)} contained in the anode off gas. The gas liquid separator 38 will be described later with reference to FIG. 2.

Part of the pipe 58 is connected to a dilution box (not shown) through a pipe 60, the purge valve 36, and a pipe 62. In the case where it is determined that power generation of the FC stack 20 is not stable, the purge valve 36 is opened for predetermined time based on an instruction from the control system 26. In the dilution box, the hydrogen in the anode off gas from the purge valve 36 is diluted by the cathode off gas.

The pressure sensor 40 detects the pressure P in the anode system 22 (pipe 58 herein), and transmits data of the pressure P to the control system 26. The FC temperature sensor 42 (fuel cell stack correlation temperature acquisition unit) detects the temperature Tfc of the FC 20 (hereinafter also referred to as the "FC temperature Tfc" or the "stack temperature Tfc"), and transmits data of the temperature to the control system 26.

(A-1-2-2. Gas Liquid Separator 38 and Its Periphery)
(A-1-2-2-1. Overview)

FIG. 2 is a view schematically showing the gas liquid separator 38 according to the embodiment of the present invention and its peripheral area. In FIG. 2, water 500 is stored in a water storage area 80 on the lower side of the gas liquid separator 38. The water 500 stored in the water storage area 80 is discharged to the outside through a water discharge channel 82 connected to the gas liquid separator 38. A drain valve 84 is provided for the water discharge channel 82. The drain valve 84 is opened/closed based on an instruction from the control system 26. Arrows 300 in FIG. 2 show flow of the water 500 when the drain valve 84 is in the open state. A PTC heater 90 (PTC: Positive Temperature Coefficient) is provided in the water storage area 80 of the gas liquid separator 38.

(A-1-2-2-2. PTC Heater 90)

The PTC heater 90 (hereinafter also referred to as the "heater 90") is a thermistor. The PTC heater 90 heats the water 500 (including the case where the water 500 is frozen) based on an instruction from the control system 26. The heater 90 produces heat by the electric current If from the battery 28. As shown in FIG. 2, an ON/OFF switch 100, a variable resistor 102, and a current sensor 104 are provided between the heater 90 and the battery 28.

The ON/OFF switch 100 is turned on/off in response to an instruction from the control system 26. The variable resistor 102 changes resistance in response to an instruction from the control system 26. Thus, the voltage applied to the heater 90 is switched. Further, the current sensor 104 detects the electric current Ih supplied from the battery 28 to the heater 90, and notifies the data of the electric current Ih to the control system 26.

Figure 3:
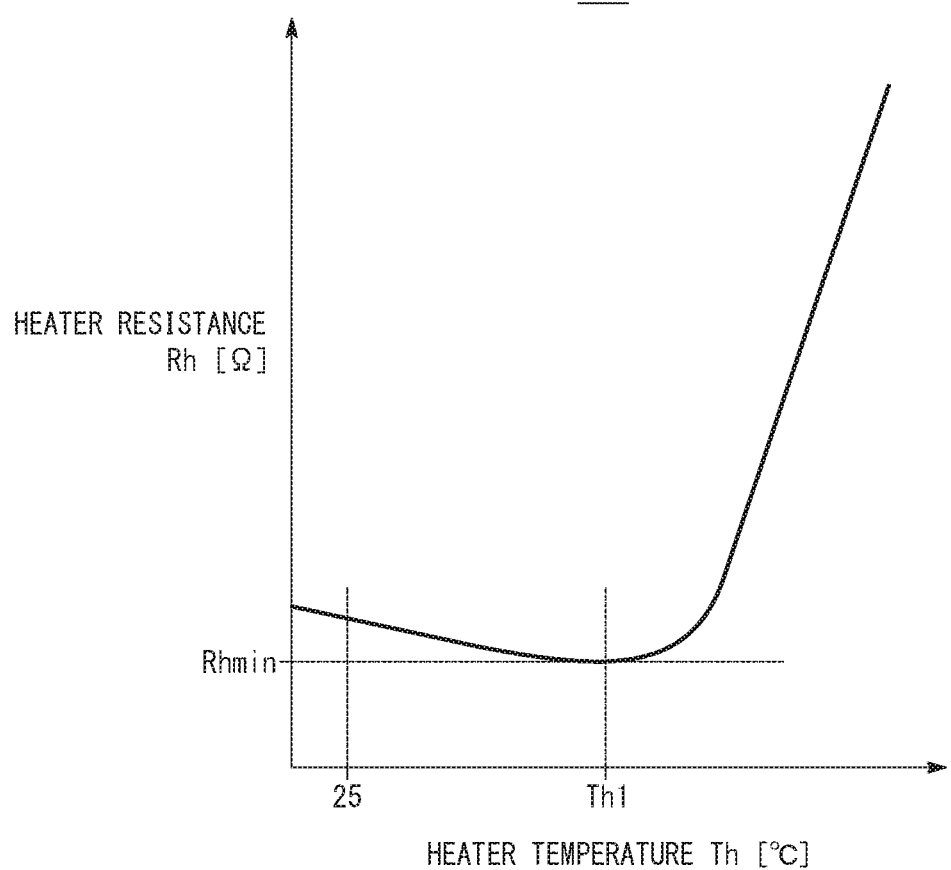
FIG. 3 is a graph showing temperature-resistance characteristics of a PTC heater according to the embodiment.

FIG. 3 is a graph showing temperature-characteristics of the PTC heater 90 according to the embodiment of the present invention. As shown in FIG. 3, when the heater temperature Th is Th1, the heater resistance Rh (hereinafter also referred to as the "resistance Rh") has the minimum value Rhmin. Further, as the heater temperature Th gets lower than Th1 and gets higher than Th1, the heater resistance Rh becomes high. It should be noted that the degree of increase in the heater resistance Rh is high in the case where the heater temperature Th gets higher than Th1, in comparison with the case where the heater temperature Th gets lower that Th1.

[A-1-3. Control System 26]
(A-1-3-1. Overview of Control System 26)

As shown in FIG. 1, the control system 26 includes various sensors 150, an electronic control device 152 (hereinafter referred to as the "ECU 152"), and a timer circuit 154.

(A-1-3-2. Various Sensors 150)

The various sensors 150 detect various sensor values needed for control by the ECU 152, and outputs the sensor values to the ECU 152. The various sensors 150 include an outside temperature sensor 160. The outside temperature sensor 160 detects the outside temperature T of the vehicle, and outputs data of the outside air temperature T to the ECU 152. The various sensors 150 may include a pressure sensor 40, an FC temperature sensor 42, and a current sensor 104.

(A-1-3-3. ECU 152)
(A-1-3-3-1. Overview of ECU 152)

The ECU 152 is a computer for controlling the entire FC system 10. As shown in FIG. 1, the ECU 152 includes an input/output unit 170, a computation unit 172, and a memory unit 174.

(A-1-3-3-2. Input/Output Unit 170)

The input/output unit 170 inputs/outputs data to/from devices (various sensors 150, etc.) other than the ECU 152. The input/output unit 170 includes an A/D converter circuit (not shown) for converting an inputted analog signal into a digital signal.

(A-1-3-3-3. Computation Unit 172)

For example, the computation unit 172 includes a central processing unit (CPU). The computation unit 172 performs computation based on signals from the various sensors 150. Then, the computation unit 172 generates signals for the anode system 22 and the cathode system 24 based on computation results.

As shown in FIG. 1, the computation unit 172 includes an FC output control unit 180, a heater temperature calculation unit 182, a heater control unit 184, and a water discharge control unit 186. These units are realized by executing programs stored in the memory unit 174. The programs may be supplied from external devices through a communication device (not shown). Some of the programs may be realized in the form of hardware (circuit components).

The FC output control unit 180 performs FC output control for controlling output of the FC 20. The FC output control controls a driving force of the entire vehicle. The FC output control is performed based on an instruction from an unillustrated integrated control electronic control device (hereinafter also referred to as the "integrated control ECU").

The heater temperature calculation unit 182 (heating unit temperature estimating unit) performs heater temperature calculation control to calculate or estimate the temperature Th of the PTC heater 90. The heater control unit 184 performs heater control to perform ON/OFF control of the PTC heater 90. The water discharge control unit 186 performs gas liquid separator water discharge control to control discharge of the water 500 in the gas liquid separator 38.

(A-1-3-3-4. Memory Unit 174)

The memory unit 174 stores programs and data utilized by the computation unit 172. For example, the memory unit 174 includes a random access memory (hereinafter referred to as the "RAM"). For example, a volatile memory such as a resistor and a non-volatile memory such as a flash memory may be used as the RAM. Further, in addition to the RAM, the memory unit 174 may have a read only memory (ROM) and/or a solid state drive (SSD).

(A-1-3-4. Timer Circuit 154)

A timer circuit 154 sets timing when the ECU 152 is turned on, and at this timing, the timer circuit 154 turns on the ECU 152.

<A-2. Gas Liquid Separator Water Discharge Control According to the Embodiment of the Present Invention>

[A-2-1. Overview]

As described above, the ECU 152 according to the embodiment of the present invention performs gas liquid separator water discharge control. In the gas liquid separator water discharge control, in the case where the water 500 is stored in the gas liquid separator 38 by predetermined quantity or more, the drain valve 84 is opened to discharge the water 500 to the outside. It should be noted that the predetermined quantity herein is not the quantity of the water 500 which is measured directly. The heater resistance Rh is used in measurement of the predetermined quantity.

As described later, the gas liquid separator water discharge control is roughly made up of the control at the time of the FC system start-up (FC system start-up mode), the control at the time of the FC system operation (FC system operation mode), and the control at the time of stopping the FC system (FC system stop mode). In the control in the FC system start-up mode (hereinafter also referred to as the "FC system start-up mode control" or the "start-up mode control"), at the time of starting operation of the FC system 10 (or at the time of starting power generation), the inside of the gas liquid separator 38 is warmed up by the PTC heater 90. It should be noted that, in the start-up mode control itself, water discharge is not performed, and water is discharged in the subsequent control in the FC system operation mode.

In the control in the FC system operation mode (hereinafter also referred to as the "FC system operation mode control" or the "operation mode control"), at the time of operating the FC system 10 (or during power generation), the water 500 in the gas liquid separator 38 is discharged, and the FC system operation mode control is performed subsequently to the start-up mode control.

In the control in the FC system stop mode (hereinafter also referred to as the "FC system stop mode control" or the "stop mode control"), at the time of stopping operation of the FC system 10 (or at the time of stopping power generation), the water 500 in the gas liquid separator 38 is discharged, and the FC system stop mode control is performed subsequently to the operation mode control. Further, in the case where the stop mode control is performed once, and thereafter, the start-up mode control is not performed for predetermined time, the stop mode control is repeated.

[A-2-2. Overall Flow of Gas Liquid Separator Water Discharge Control]

Figure 4:
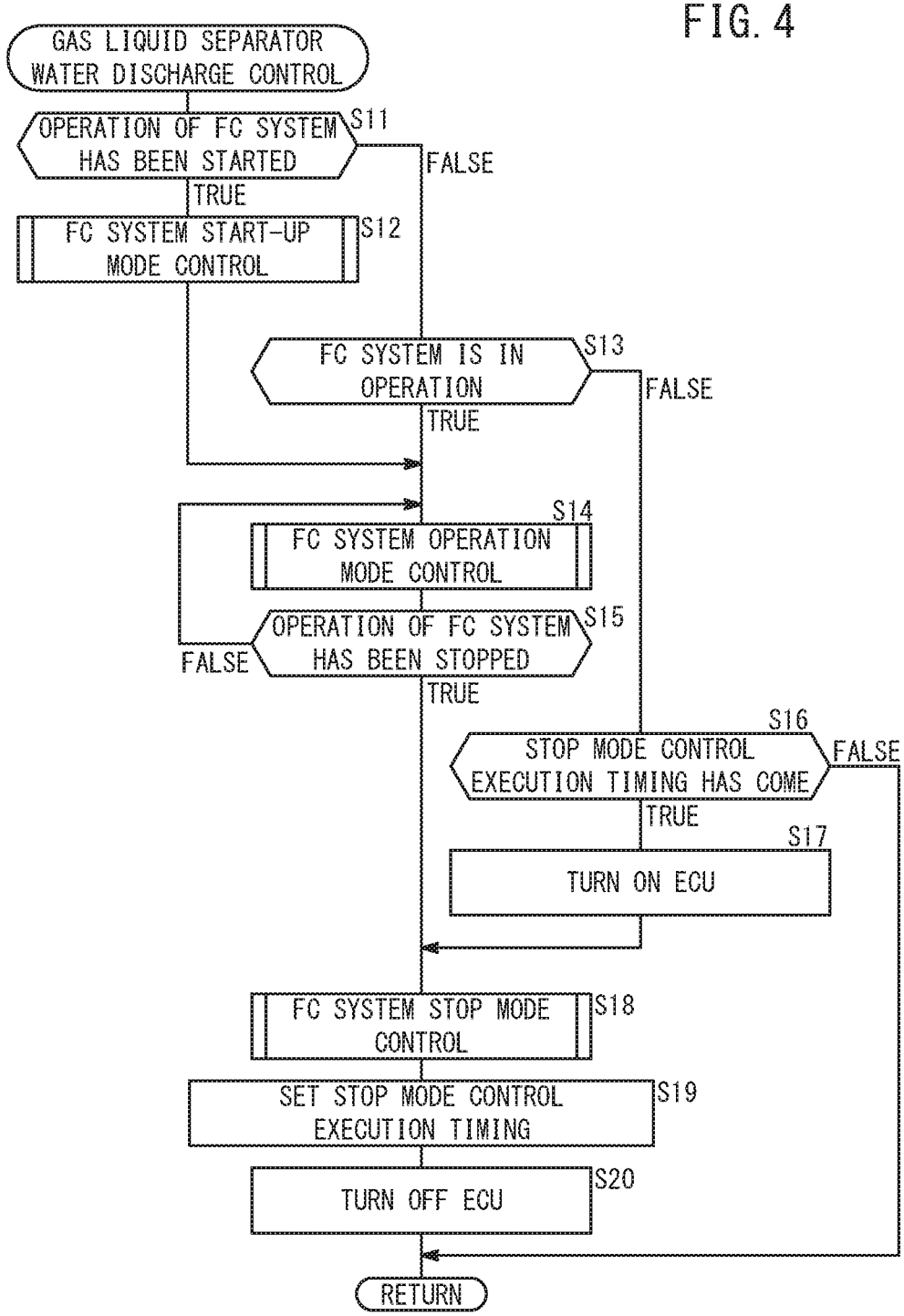
FIG. 4 is a flow chart showing overview of gas liquid separator water discharge control according to the embodiment.

FIG. 4 is a flow chart showing the overview of the gas liquid separator water discharge control according to the embodiment of the present invention. In step S11, the ECU 152 determines whether operation of the FC system 10 has been started. For example, this determination is made based on notification from the FC output control unit 180. In the case where operation of the FC system 10 has been started (S11: TRUE), the routine proceeds to step S12. In step S12, the ECU 152 performs start-up mode control. The start-up mode control will be described later with reference to FIGS. 7 and 8. After step S12, the routine proceeds to step S14.

In the case where operation of the FC system 10 has not been started (S11: FALSE), the routine proceeds to step S13. In step S13, the ECU 152 determines whether or not the FC system 10 is in operation. For example, this determination is made based on notification from the FC output control unit 180. In the case where the FC system 10 is in operation (S13: TRUE), the routine proceeds to step S14. In step S14, the ECU 152 performs operation mode control. Operation mode control will be described later with reference to FIGS. 5 and 6.

In step S15, the ECU 152 determines whether or not operation of the FC system 10 has been stopped. For example, this determination is made based on notification from the FC output control unit 180. In the case where operation of the FC system 10 has been stopped (S15: TRUE), the routine proceeds to step S18. In the case where operation of the FC system 10 has not been stopped (S15: FALSE), the routine returns to step S14.

In step S13, in the case where the FC system 10 is not in operation (S13: FALSE), operation of the FC system 10 is stopped. In this case, in step S16, the ECU 152 determines whether or not the timing of performing the stop mode control has come. For example, this determination is made based on monitoring by the timer circuit 154. In the case where the timing of performing the stop mode control has come (S16: TRUE), the routine proceeds to step S17. In the case where the timing of performing the stop mode control has not come (S16: FALSE), the current gas liquid separator water discharge control is finished, and the routine returns to step S11 after elapse of predetermined time.

In step S17, the ECU 152 is turned on by the timer circuit 154. In step S18, the ECU 152 performs stop mode control. The stop mode control will be described later with reference to FIG. 10. In step S19, the ECU 152 sets, or updates timing of performing stop mode control by the timer circuit 154. In step S20, the ECU 152 is placed in the OFF state (or sleep mode). Then, the current gas liquid separator water discharge control is finished, and the routine returns to step S11 after elapse of predetermined time.

[A-2-3. FC System Operation Mode Control]

For ease of understanding, hereinafter, before the start-up mode control (S12 in FIG. 4), the operation mode control (S14) will be described. As described above, in the operation mode control, the water 500 in the gas liquid separator 38 is discharged at the time of operating the FC system 10 (or during power generation), and the operation mode control is performed subsequently to the start-up mode control.

Figure 5:
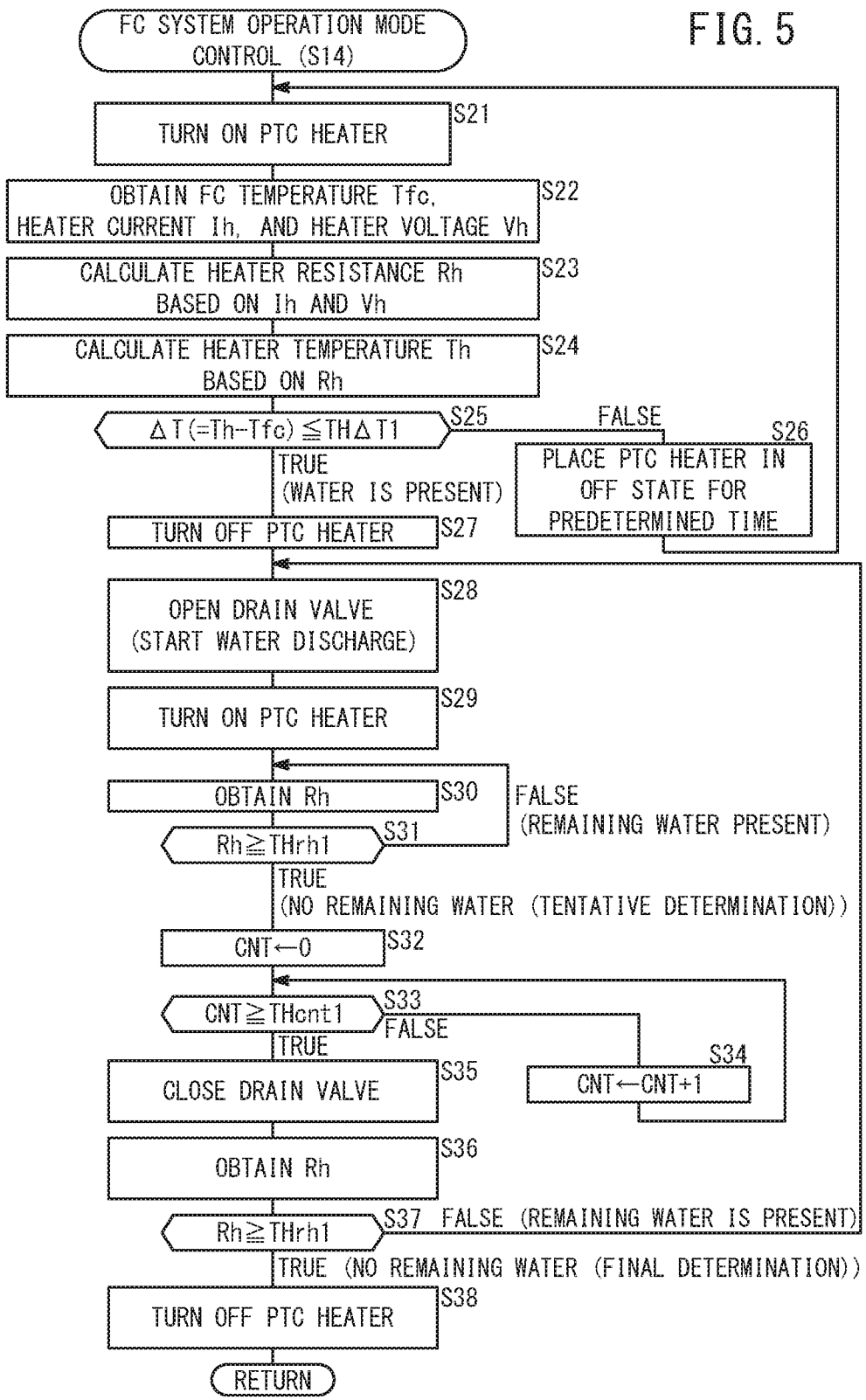
FIG. 5 is a flow chart of control at the time of FC system operation according to the embodiment (details of S14 in FIG. 4)
Figure 6:
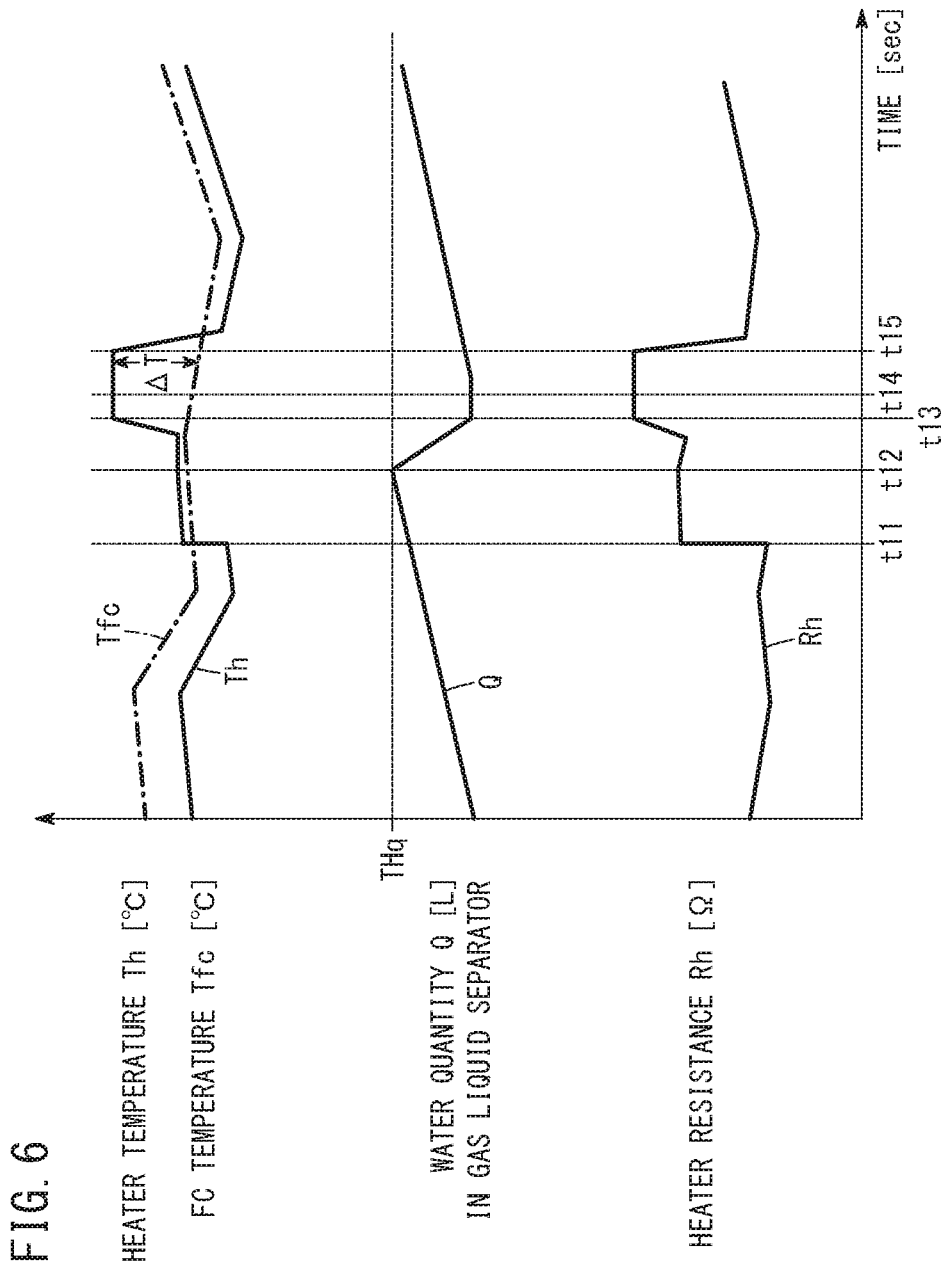
FIG. 6 is a time chart showing an example of various numeric values when the control at the time of the FC system operation according to the embodiment.

FIG. 5 is a flow chart of the FC system operation mode control according to the embodiment of the present invention (details of S14 in FIG. 4). FIG. 6 is a time chart showing an example of various numeric values at the time of performing the FC system operation mode control according to the embodiment of the present invention. In FIG. 6, the heater temperature Th, the FC temperature Tfc, the water quantity Q[L] in the gas liquid separator 38, and the heater resistance Rh are shown.

In steps S21 to S25 of FIG. 5, it is determined whether or not the water 500 is stored in the gas liquid separator 38. Specifically, in step S21, the ECU 152 turns on the PTC heater 90 (time t11 in FIG. 6). In step S22, the ECU 152 obtains the FC temperature Tfc from the FC temperature sensor 42, the heater current Ih from the current sensor 104, and the heater voltage Vh applied to the heater 90. The heater voltage Vh is calculated based on the output voltage of the battery 28 and the resistance of the variable resistor 102 set by the ECU 152.

In step S23, the ECU 152 calculates the heater resistance Rh based on the heater current Ih and the voltage Vh applied to the heater 90 (Rh=Vh/Ih).

In step S24, the ECU 152 calculates the heater temperature Th based on the heater resistance Rh. Specifically, a map 200 (Th-Rh map 200 in FIG. 3) defining the relationship between the heater resistance Rh and the heater temperature Th is stored in the memory unit 174 beforehand. Then, the ECU 152 reads the heater temperature Th corresponding to the heater resistance Rh from the Th-Rh map 200, and uses this heater temperature Th.

It should be noted that, as shown in FIG. 3, the PTC heater 90 has the minimum value Rhmin of the resistance Rh when the heater temperature Th is Th1, and the resistances before, and after the temperature Th1 are higher than the minimum value Rhmin. In the case of using the above heater 90, in consideration of the temperature of the coolant or the temperature of the hydrogen gas (not shown), it is determined whether the resistance Rh is larger than, or smaller than the minimum Rhmin.

Referring back to FIG. 5, in step S25, the ECU 152 determines whether or not the difference ΔT between the heater temperature Th and the FC temperature Tfc (hereinafter also referred to as the "temperature difference ΔT") is not more than a first temperature difference threshold value THΔT1. The first temperature difference threshold value THΔT1 is a threshold value for determining whether or not part of the PTC heater 90 or the entire PTC heater 90 is immersed in the water 500. That is, in the case where some of the PTC heater 90 or the entire PTC heater 90 is immersed in the water 500, the temperature difference ΔT is relatively small, and in the case where the PTC heater 90 is not immersed in the water 500, the temperature difference ΔT is relatively large. The first temperature threshold value THΔT1 is used for distinguishing these states.

In the case where the temperature difference ΔT is more than the first temperature difference threshold value THΔT1 (S25: FALSE), the FTC heater 90 is not immersed in the water 500. Stated otherwise, the water quantity Q of the water 500 is not more than the water quantity threshold value THq. Then, in step S26, the ECU 152 turns off the PTC heater 90 for predetermined time. Then, the routine returns to step S21. In the case where the temperature difference ΔT is not more than the first temperature difference threshold value THΔT1 (S25: TRUE), part of the PTC heater 90 or the entire PTC heater 90 is immersed in the water 500. In this case, in step S27, the ECU 152 turns off the PTC heater 90.

In step S28 to S34 in FIG. 5, the water 500 in the gas liquid separator 38 is discharged to the outside. Among these steps, in steps S28 to S31, it is determined tentatively that there is no remaining water in the gas liquid separator 38. Depending on inclination of the vehicle, in the determination of steps S28 to S31, it may be erroneously determined that there is no remaining water. Therefore, after the elapse of certain time from steps S28 to S31, steps S32 to S37 are performed to confirm that there is no remaining water in the gas liquid separator 38 again.

In step S28 of FIG. 5, the ECU 152 opens the drain valve 84 (time point t12 of FIG. 6). As a result, the water 500 in the gas liquid separator 38 is started to be discharged to the outside through the drain valve 84. In step S29, the ECU 152 turns on the PTC heater 90. It should be noted that, in the case where the time period between step S27 and step S29 of FIG. 5 is short, both of step S27 and step S29 may be canceled.

In step S30, the ECU 152 obtains or calculates the heater resistance Rh in the same manner as the steps S22 and S23. In step S31, the ECU 152 determines whether or not the heater resistance Rh has a value not less than a first resistance threshold value THrh1. The first threshold value THrh1 is set to a value of temperature which is improbable when part of the PTC heater 90 or the entire PTC heater 90 is immersed in the water 500. In the case where the heater resistance Rh is less than the first resistance threshold value THrh1 (S31: FALSE), there is a possibility that heating by the PTC heater 90 is insufficient, and part of the PTC heater 90 or the entire PTC heater 90 is not immersed in the water 500. In this case, the routine returns to step S30. In the case where the heater resistance Rh is not less than the first resistance threshold value THrh1 (S31: TRUE), it is considered that the PTC heater 90 is heated sufficiently, and the PTC heater 90 is not immersed in the water 500 (time point t13 in FIG. 6). In this case, the routine proceeds to step S32.

In step S32, the ECU 152 resets the count value CNT. In step S33, the ECU 152 determines whether or not the count value CNT is not less than a first count threshold value THcnt1. The first count threshold THcnt1 is determined in a manner that, even if the vehicle is inclined at the time point of step S31, there is ample time after that, to eliminate the inclination. In the case where the count value CNT is less than the first count threshold value THcnt1 (S33: FALSE), in step S34, the ECU 152 increments the count value CNT by 1, and the routine returns to step S33. In the case where the count value CNT is not less than the first count threshold value THcnt1 (S33: TRUE), the routine proceeds to step S35.

In step S35, the ECU 152 closes the drain valve 84 (time point t14 in FIG. 6). In step S36, the ECU 152 obtains the heater resistance Rh in the same manner as step S30. In step S37, the ECU 152 determines whether or not the heater resistance Rh has a value not less than the first resistance threshold value THrh1. Step S37 is performed in the same manner as step S31. However, different first resistance threshold values THrh1 may be used in steps S31 and S37.

In the case where the heater resistance Rh has a value less than the first resistance threshold value THrh1 (S37: FALSE), there is a possibility that part of the PTC heater 90 or the entire PTC heater 90 is immersed in the water 500. That is, this situation is considered as follows: At the time point of step S31, the vehicle was inclined. Therefore, the PTC heater 90 was not immersed in the water 500. However, inclination of the vehicle has been changed since then. As a result, part of the PTC heater 90 or the entire PTC heater 90 is immersed in the water 500. In this case, the routine returns to step S28. In the case where the heater resistance Rh has a value not less than the first resistance threshold value THrh1 (S37: TRUE), the determination that the PTC heater 90 is not immersed in the water 500 is confirmed, and the routine proceeds to step S38. In step S38, the ECU 152 turns off the PTC heater 90, and finishes the current operation mode control (time point t15 in FIG. 6).

[A-2-4. FC System Start-up Mode Control]

As described above, in the FC system start-up mode control (S12 in FIG. 4), at the time of starting operation of the FC system 10 (or at the time of starting power generation), the inside of the gas liquid separator 38 is warmed up by the PTC heater 90. It should be noted that, water discharge is not performed in the start-up mode control itself, and water discharge is performed in the subsequent FC system operation mode control.

Figure 7:
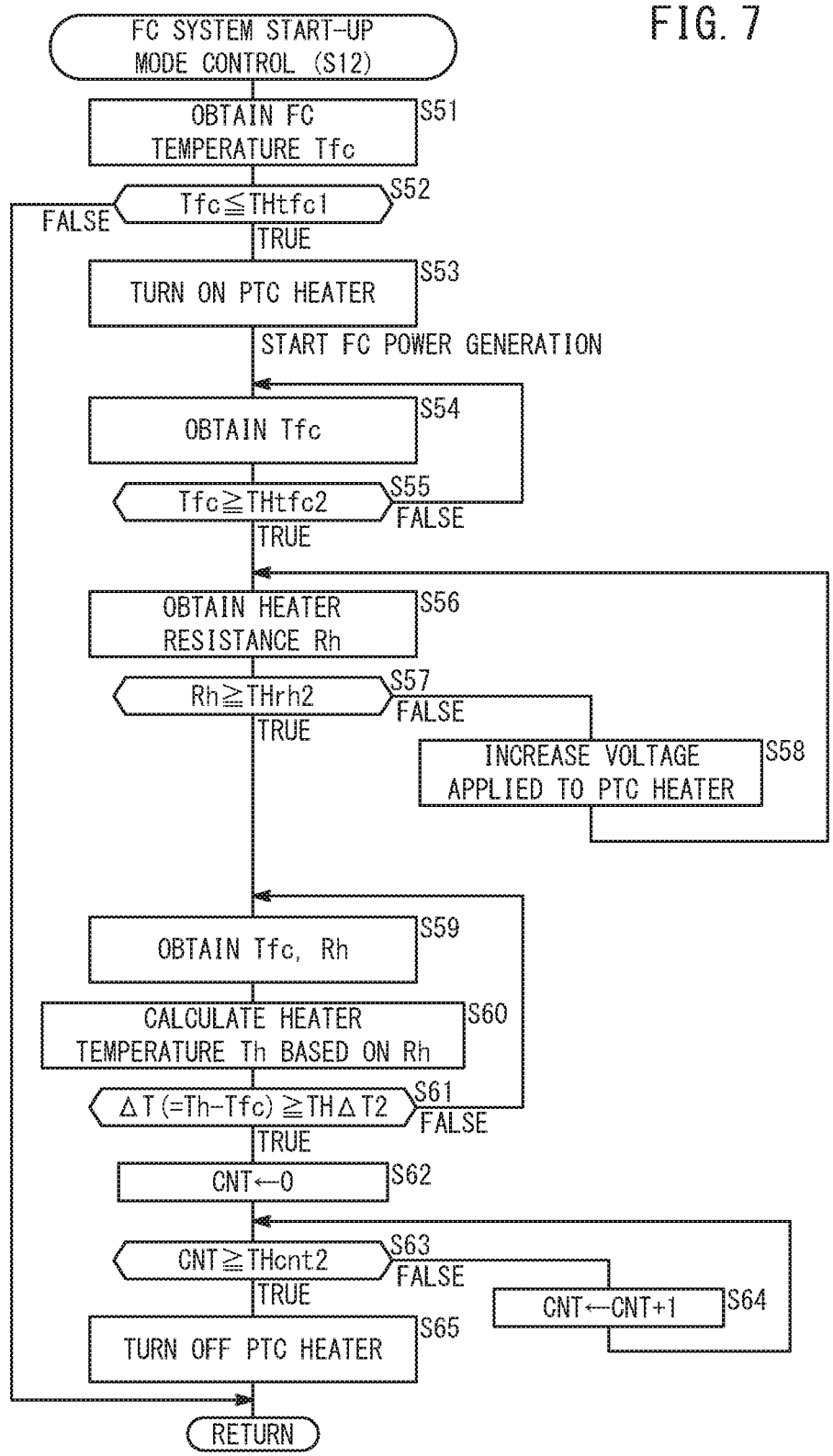
FIG. 7 is a flow chart of control at the time of FC system start-up according to the embodiment (details of S12 in FIG. 4)
Figure 8:
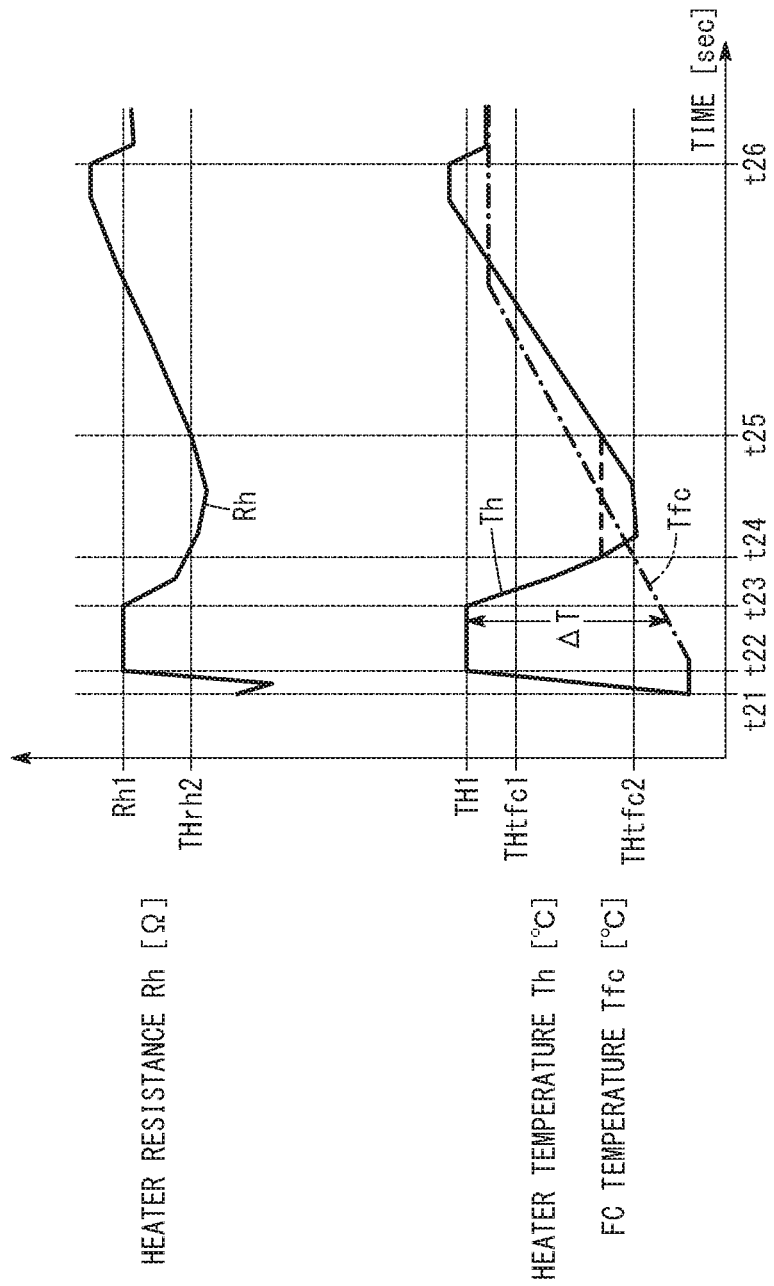
FIG. 8 is a time chart showing an example of various numeric values when the control at the time of the FC system start-up according to the embodiment is performed.

FIG. 7 is a flow chart (details of S12 in FIG. 4) showing the FC system start-up mode control according to the embodiment of the present invention. FIG. 8 is a time chart showing an example of various numeric values at the time of performing FC system start-up mode control according to the embodiment. In FIG. 8, the heater resistance Rh, the heater temperature Th, and the FC temperature Tfc are shown.

In steps S51, S52 of FIG. 7, the necessity of heating by the PTC heater 90 is determined. Specifically, in step S51, the ECU 152 obtains the FC temperature Tfc from the FC temperature sensor 42. In step S52, the ECU 152 determines whether or not the FC temperature Tfc is not more than the first temperature threshold value THtfc1. The first temperature threshold THtfc1 is a threshold value for determining whether or not the FC 20 is in the extremely low temperature state. For example, the first temperature threshold value THtfc1 is set in a range between −10 to −40° C. In the case where the FC temperature Tfc is more than the first temperature threshold value THtfc1 (S52: FALSE), the current start-up mode control is finished. In the case where the FC temperature Tfc is not more than the first temperature threshold THtfc1 (S52: TRUE), the routine proceeds to step S53.

In step S53, the ECU 152 turns on the PTC heater 90 (time point t21 in FIG. 8). As a result, the heater resistance Rh is increased to Rh1, and the heater temperature Th is increased to Th1 (time point t22 in FIG. 8). By turning on the PTC heater 90, the ECU 152 starts power generation of the FC 20.

In steps S54 and S55, in the case where there is ice in the gas liquid separator 38, it is determined whether or not the ice is thawed by operation of the PTC heater 90 or the FC 20, and the water 500 is stored in the area around the PTC heater 90. That is, in step S54, the ECU 152 obtains or updates the FC temperature Tfc. In step S55, the ECU 152 determines whether or not the FC temperature Tfc is not less than the second temperature threshold THtfc2. In the case where the FC temperature Tfc is less than the second temperature threshold THtfc2 (S55: FALSE), the routine returns to step S54. In the case where the FC temperature Tfc is not less than the second temperature threshold THtfc2 (S55: TRUE), the routine proceeds to step S56 (time point t23 in FIG. 8).

Instead of steps S54, S55, for example, the time elapsed from the start of turning on the PTC heater 90 may be used. Alternatively, the change of the heater resistance Rh may be used instead of steps S54, S55.

In step S56, the ECU 152 obtains the heater resistance Rh in the same manner as steps S22, S23 in FIG. 5. In step S57, the ECU 152 determines whether or not the heater resistance Rh is not less than the second resistance threshold value THrh2. The second resistance threshold value THrh2 is a threshold value used for determining whether or not the PTC heater 90 has been heated sufficiently. In the case where the heater resistance Rh is less than the second resistance threshold value THrh2 (S57: FALSE), in step S58, the ECU 152 controls the variable resistor 102 (FIG. 2) to increase the voltage Vh applied to the PTC heater 90, and the routine returns to step S56. The heater temperature Th denoted by a broken line from the time point t24 to the time point t25 in FIG. 8 indicates the value in the case where the voltage Vh applied to the PTC heater 90 is increased, and the heater temperatures Th denoted by a solid line from the time point t24 to the time point t25 indicates the value in the case where the voltage Vh applied to the PTC heater 90 is not increased.

If the heater resistance Rh is not less than the second resistance threshold value THrh2 (S57: TRUE), the routine proceeds to step S59. In step S59, the ECU 152 obtains the FC temperature Tfc and the heater resistance Rh. In step S60, the ECU 152 calculates the heater temperature Th based on the heater resistance Rh. Step S60 is carried out in the same manner as step S24 in FIG. 5.

In step S61, the ECU 152 determines whether or not the temperature difference ΔT between the heater temperature Th and the FC temperature Tfc is not less than the second temperature threshold value THΔT2. The second temperature difference threshold value THΔT2 is a threshold used for determining whether part of the PTC heater 90 or the entire PTC heater 90 is immersed in the water 500. Specifically, in the case where part of the PTC heater 90 or the entire PTC heater 90 is immersed in the water 500, the temperature difference ΔT becomes relatively small, and in the case where the PTC heater 90 is not immersed in the water 500, the temperature difference ΔT become relatively large. The second temperature difference threshold value THΔT2 is used for distinguishing these states.

In the case where the temperature difference ΔT is less than the second temperature difference threshold value THΔT2 (S61: FALSE), part of the PTC heater 90 or the entire PTC heater 90 is immersed in the water 500. Therefore, operation of the PTC heater 90 is continued, and the routine returns to step S59. In the case where the temperature difference ΔT is not less than the second temperature difference threshold value THΔT2 (S61: TRUE), the PTC heater 90 is not immersed in the water 500. Then, the routine proceeds to step S62.

In step S62, the ECU 152 resets the count value CNT. In step S63, the ECU 152 determines whether or not the count value CNT is not less than the second count threshold value THcnt2. The second count threshold value THcnt2 indicates a period of time needed for sufficiently warming the water produced in the gas liquid separator 38. In the case where the count value CNT is less than the second count threshold value THcnt2 (S63: FALSE), in step S64, the ECU 152 increments the counter value CNT by 1, and the routine returns to step S63. In the case where the count value CNT is not less than the second count threshold value THcnt2 (S63: TRUE), the routine proceeds to step S65.

In step S65, the ECU 152 turns off the PTC heater 90 (time point t26 in FIG. 8).

[A-2-5. FC System Stop Mode Control]

As described above, in the FC system stop mode control, at the time of stopping operation of the FC system 10 (or at the time of stopping power generation), the water 500 in the gas liquid separator 38 is discharged, and the FC system stop mode control is performed subsequently to the operation mode control. Further, if the stop mode control is performed once, and thereafter, the start-up mode control is not performed for predetermined time, the stop mode control is repeated.

Figure 9:
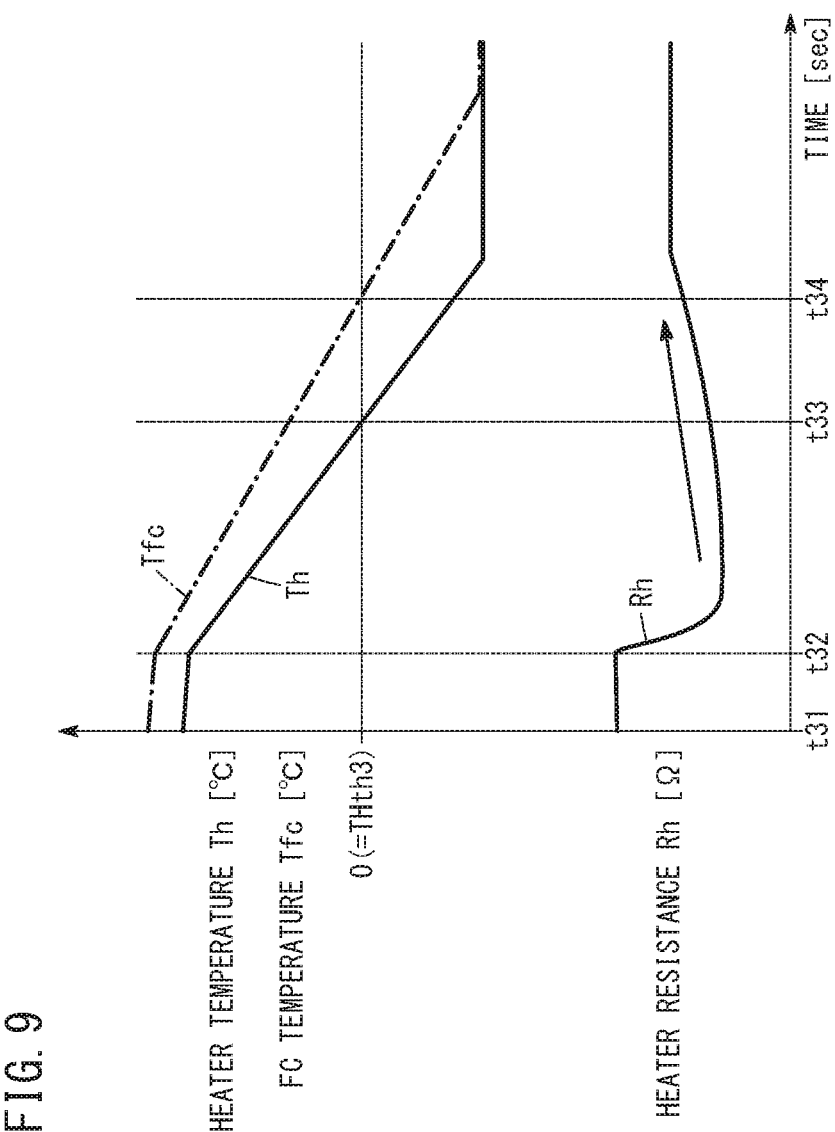
FIG. 9 is a time chart showing an example of various numeric values in the case where control at the time of stopping the FC system according to the embodiment is not performed.

FIG. 9 is a time chart showing an example of various numeric values in the case where the FC system stop mode control according to the embodiment of the present invention is not performed. In FIG. 9, the heater temperature Th, the FC temperature Tfc, and the heater resistance Rh are shown.

Power generation of the FC system 10 is performed during the period between the time point t31 and the time point t32 in FIG. 9. At this time, the heater 90 is in the OFF state. Therefore, the heater temperature Th is the same temperature as the peripheral auxiliary devices of the FC 20. That is, by the heat generated in the FC 20, etc., the heater temperature Th becomes higher than the outside air temperature.

At the time point t32, operation of the FC system 10 is stopped. Thus, heat generation by the FC 20 is stopped. Additionally, the outside air temperature gets lower due to sunset, etc. Therefore, the FC temperature Tfc and the heater temperature Th are decreased from the time point t32.

During power generation (t31 to t32) of the FC system 10, the FC temperature Tfc and the heater temperature Th change while having values relatively close to each other. After stopping operation of the FC system 10, the temperature of the FC 20 having large heat mass is decreased gradually. In contrast, the temperatures of the heater 90 and the other peripheral auxiliary devices are decreased relatively steeply.

Therefore, the heater temperature Th reaches 0° C. (time point t33) before the FC temperature Tfc, and the other peripheral auxiliary devices start to be frozen. Thereafter, at the time point t34, the FC temperature Tfc reaches 0° C.

Therefore, if the temperatures of other peripheral auxiliary devices are monitored based on the FC temperature Tfc, errors become large, and it becomes difficult to suitably identify freezing of other peripheral auxiliary devices.

Therefore, in the embodiment of the present invention, the temperatures of the other peripheral auxiliary devices are monitored using the heater temperature Th instead of the FC temperature Tfc.

Figure 10:
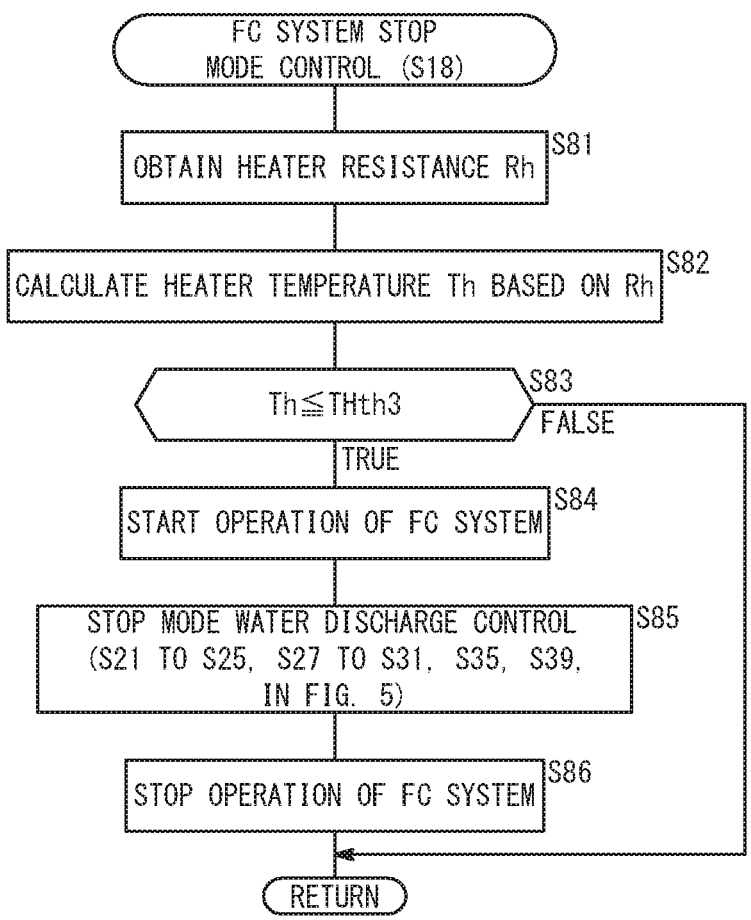
FIG. 10 is a flow chart of the control at time of stopping the FC system according to the embodiment (details of S18 in FIG. 4).

FIG. 10 is a flow chart (details of S18 in FIG. 4) of the FC system stop mode control according to the embodiment of the present invention. For example, the stop mode control is started from the time point t32 in FIG. 9. In step S81 of FIG. 10, the ECU 152 obtains the heater resistance Rh in the same manner as in the cases of steps S22, S23 in FIG. 5. In step S82, the ECU 152 calculates the heater temperature Th based on the heater resistance Rh.

In step S83, the ECU 152 determines whether or not the heater temperature Th is not more than a third temperature threshold value THth3. The third temperature threshold value THth3 is a threshold value for determining the start of freezing of the water 500. For example, the third temperature threshold value THth3 is a fixed value in a range between −1° C. and 3° C. In FIG. 9, the third temperature threshold value THth3 is 0° C. In the case where the heater temperature Th is more than the third temperature THth3 (S83: FALSE), the current stop mode control is finished. In the case where the heater temperature Th is not more than the third temperature threshold value THth3 (S83: TRUE), the routine proceeds to step S84.

In step S84, the ECU 152 starts operation of the FC system 10 (time point t33 in FIG. 9). As a result of starting operation of the FC system 10, the PTC heater 90 is turned on. Therefore, in the example of FIG. 9, at the time point t33, the heater temperature Th is increased (in FIG. 9, increase in the heater temperature Th is not shown).

In step S85, the ECU 152 performs water discharge control in the stop mode (stop mode water discharge control). In the stop mode water discharge control, steps S21 to S25, S27 to S31, S35, and S38 in FIG. 5 are performed. In step S86, the ECU 152 stops operation of the FC system 10, and finishes the current stop mode control.

<A-3. Advantages of the Embodiment of the Present Invention>

As described above, in the embodiment of the present invention, the presence/absence of the water 500 in the gas liquid separator 38 is determined based on the FC temperature Tfc (correlation temperature of the fuel cell stack) and the heater temperature Th (temperature of the heating unit) (S25 in FIG. 5). Therefore, it becomes possible to recognize the presence of the water 500 in the gas liquid separator 38 using the simple system, without requiring additional component parts such as a water level sensor. Otherwise, also in the case where additional component parts such as a water level sensor is provided, by applying the embodiment of the present invention, it is possible to obtain the advantage in respect of the fail-safe feature. Therefore, it becomes possible to suitably detect or discharge the water 500 in the FC system 10.

In the embodiment of the present invention, at the time of starting operation at low temperature (S52: TRUE in FIG. 7), the ECU 152 (control unit) performs heating control (S53) using the PTC heater 90 (heating unit), and controls heating quantity of the heater 90 based on a determination result regarding the presence/absence of the water 500 (S56 to S58). In this manner, by suitably performing heating control at the time of starting operation at low temperature, it becomes possible to suppress clogging due to the freezing of the water 500.

In the embodiment of the present invention, the gas liquid separator 38 includes the drain valve 84 for discharging water 500 stored in the water storage area 80 (FIG. 2). Further, the ECU 152 (control unit) drives the drain valve 84 based on a determination result regarding the presence/absence of the water 500 (S28 in FIG. 5) to perform the water discharge control. Thus, with the simple configuration, it becomes possible to perform water discharge control in the gas liquid separator 38.

In the embodiment of the present invention, the ECU 152 (control unit) determines whether or not water discharge has been performed normally, based on the resistance Rh of the PTC heater 90 (heating unit) during water discharge control (S30, S31 in FIG. 5). Since the heater resistance Rh is monitored to determine whether or not water discharge has been completed, it becomes possible to realize the water discharge control with simple configuration at low cost.

In the embodiment of the present invention, in the case where the heater resistance Rh (resistance of the heating unit) becomes not less than the first resistance threshold value THrh1 (S31 in FIG. 5: TRUE), the ECU 152 (control unit) determines that water discharge has been performed normally. In this manner, it becomes possible to simply determine that water discharge has been finished normally.

In the embodiment of the present invention, the ECU 152 (control unit) determines that water discharge has been performed normally (S31 in FIG. 5: TRUE). Thereafter, it is determined that the water 500 is remaining in the gas liquid separator 38 when the heater resistance Rh has become less than the first resistance threshold value THrh1 (S37: FALSE), and water discharge control is performed again (S28 to S35).

Due to inclination of the FC system 10 (or the vehicle (movable object) equipped with the FC system 10), even though water discharge has been performed normally, it may be determined erroneously that the water discharge has been completed. In the embodiment of the present invention, inclination state of the FC system 10 is eliminated, and in the case where the remaining water is recognized, since the water discharge control is performed again, it becomes possible to reliably suppress clogging due to freezing.

B. Modified Embodiment

It should be noted that the present invention is not limited to the above embodiment. It is a matter of course that various configurations can be adopted based on the description of the specification of the present application. For example, it is possible to adopt the following configuration.

<B-1. Applications>

In the above embodiment, it is assumed that the electrical energy generated in the FC system 10 is supplied to the fuel cell vehicle (FCV). However, for example, in terms of determining the presence/absence of the water 500 in the gas liquid separator 38 based on the FC temperature Tfc and the heater temperature Th, the present invention is not limited in this respect. For example, the electrical energy generated in the FC system 10 may be supplied to houses.

<B-2. Gas Liquid Separator 38>

In the above embodiment, the gas liquid separator 38 is provided in the anode system 22 (FIG. 1). However, for example, in terms of determining the presence/absence of the water 500 in the gas liquid separator 38 based on the FC temperature Tfc and the heater temperature Th, the present invention is not limited in this respect. For example, the gas liquid separator 38 may be provided in the cathode system 24, in addition to, or instead of the anode system 22.

<B-3. Control of ECU 152>

[B-3-1. General Gas Liquid Separator Water Discharge Control]

In the gas liquid separator water discharge control of the above embodiment, the start-up mode control shown in FIG. 7, the operation mode control shown in FIG. 5, and the stop mode control shown in FIG. 10 are used in combination. However, for example, in terms of determining the presence/absence of the water 500 in the gas liquid separator 38 based on the FC temperature Tfc and the heater temperature Th, the present invention is not limited in this respect. For example, the start-up mode control may be performed in a method other than that shown in FIG. 7. Otherwise, the operation mode control may be performed in a method other than that shown in FIG. 5. Otherwise, the stop mode control may be performed in a method other than that shown in FIG. 10.

[B-3-2. Start-up Mode Control]

In the start-up mode control of the above embodiment, the voltage Vh applied to the PTC heater 90 was changed (S56 to S58 in FIG. 7) using the variable resistor 102 (FIG. 2). However, for example, in terms of changing the voltage Vh applied to the heater 90, the present invention is not limited in this respect. For example, the voltage Vh applied to the PTC heater 90 may be changed using a converter.

In the start-up mode control of the above embodiment, the voltage Vh applied to the PTC heater 90 was changed (S56 to S58 in FIG. 7) based on the heater resistance Rh. However, for example, in terms of determining the presence/absence of the water 500 in the gas liquid separator 38 based on the FC temperature Tfc and the heater temperature Th, the present invention is not limited in this respect. For example, the voltage Vh applied to the PTC heater 90 may be constant.

[B-3-3. Operation Mode Control]

In the above embodiment, the present/absence of the water 500 in the gas liquid separator 38 is determined based on the FC temperature Tfc and the heater temperature Th (S25 in FIG. 5). However, for example, in terms of determining the presence/absence of the water 500 in the gas liquid separator 38 based on the correlation temperature of the fuel cell stack correlated to the temperature of the FC stack 20, and the heating unit temperature correlated to the temperature of the heating unit provided at the bottom of the water storage area 80 of the gas liquid separator 38, the present invention is not limited in this respect. For example, instead of the FC temperature Tfc (stack temperature Tfc), the temperature of the coolant cooling the FC 20 may be used as the correlation temperature of the fuel cell stack.

In the above embodiment, the ECU 152 (control unit) determines whether or not water discharge has been performed normally (S30, S31 in FIG. 5) based on the resistance Rh of the PTC heater 90 (heating unit) during the water discharge control. However, in terms of determining whether or not water discharge of the gas liquid separator 38 has been completed, the present invention is not limited in this respect. For example, the ECU 152 (control unit) may determine whether or not water discharge has been performed normally, based on the temperature change of the PTC heater 90 (heating unit) during the water discharge control. Since it is determined whether or not water discharge has been completed by monitoring the temperature change of the heater 90, with the simple configuration at low cost, it becomes possible to realize the water discharge control.

In the above embodiment, the ECU 152 (control unit) determines that water discharge has been performed normally when the heater resistance Rh (resistance of the heating unit) becomes not less than the first resistance threshold value THrh1 (S31 of FIG. 5: TRUE). However, for example, in terms of determining whether or not water discharge of the gas liquid separator 38 has been completed, the present invention is not limited in this respect.

For example, the ECU 152 (control unit) may determine that water discharge has been performed normally based on the difference $\Delta T$ between the FC temperature Tfc and the heater temperature Th, i.e., when the heater temperature Th is changed by a predetermined value or more, relative to the FC temperature Tfc. Since whether or not water discharge is performed by the heater temperature Th, based on the FC temperature Tfc of the FC stack 20 having large heat mass, it becomes possible to make a water discharge determination suitably in accordance with the system operating condition.

In the embodiment of the present invention, the ECU 152 (control unit) determines that water discharge has been performed normally (S31 in FIG. 5: TRUE), and thereafter, determines that the heater resistance Rh has become less than the first resistance threshold value THrh1 (S37: FALSE), and the water 500 is remaining in the gas liquid separator 38. Then, the ECU 152 performs the water discharge control again (S28 to S35). However, for example, in terms of determining the presence/absence of the water 500 in the gas liquid separator 38 based on the FC temperature Tfc and the heater temperature Th, the present invention is not limited in this respect. For example, steps S32 to S34 in FIG. 5 need not necessarily be performed.

[B-3-4. Stop Mode Control]

In the stop mode control of the above embodiment, the stop mode water discharge control (S85 in FIG. 10) is performed in the same manner as steps S21 to S25, S27 to S31, S35, and S38 in FIG. 5. However, in terms of discharging the water 500 in the gas liquid separator 38, the present invention is not limited in this respect.

[B-3-5. Other]

In the embodiment of the present invention, in comparison of numeric values, equality signs are used in some cases, and equality signs are not included in other cases. However, for example, unless there is any special meaning to include or not to include equality signs (i.e., as long as advantages of the present invention are obtained), it is possible to arbitrarily determine whether the equality sign should be included or the equality sign should not be included.

In this sense, for example, determination of whether or not the temperature difference $\Delta T$ in step S25 in FIG. 5 is not more than the first temperature difference threshold value TH$\Delta$T1 is replaced by determination of whether or not the temperature difference $\Delta T$ is less than the first temperature difference threshold value TH$\Delta$T1.

In the embodiment of the present invention, flows shown in FIGS. 4, 5, 7, and 10 are used. However, for example, as long as the advantages of the present invention are obtained, the details of the flow (order of steps) are not limited in this respect. For example, the order of step S35 and step S36 in FIG. 5 may be interchanged.

What is claimed is:

1. A fuel cell system comprising:
   a fuel cell stack;
   a fuel gas supply pipe configured to supply a fuel gas to the fuel cell stack;
   an oxygen-containing gas supply pipe configured to supply an oxygen-containing gas to the fuel cell stack;

a gas liquid separator provided at least in one of the fuel gas supply pipe and the oxygen-containing gas supply pipe;
a temperature sensor configured to obtain a correlation temperature correlated to a temperature of the fuel cell stack;
a heater provided at a bottom of a water storage area of the gas liquid separator; and
one or more processors,
wherein the one or more processors
estimate a temperature of the heater and
determine presence/absence of water in the gas liquid separator based on the correlation temperature of the fuel cell stack and the temperature of the heater.

2. The fuel cell system according to claim 1, wherein the one or more processors perform heating control using the heater at time of starting operation at a low temperature, and control heating quantity of the heater based on a determination result regarding the presence/absence of the water.

3. The fuel cell system according to claim 1, wherein the gas liquid separator comprises a drain valve configured to discharge water stored in the water storage area; and
the one or more processors perform water discharge control by driving the drain valve based on a determination result regarding the presence/absence of the water.

4. The fuel cell system according to claim 3, wherein the one or more processors determine whether water discharge has been performed normally based on temperature change of the heater during the water discharge control.

5. The fuel cell system according to claim 4, wherein the one or more processors determine that water discharge has been performed normally when the temperature of the heater is changed by a predetermined value or more, relative to the correlation temperature of the fuel cell stack.

6. The fuel cell system according to claim 5, wherein after the one or more processors determines that water discharge has been performed normally, the one or more processors determine that remaining water is present in the gas liquid separator when temperature of the heater is changed by less than a predetermined value, relative to the correlation temperature of the fuel cell stack, and perform water discharge control again.

7. A method of controlling a fuel cell system, the fuel cell system comprising:
a fuel cell stack;
a fuel gas supply pipe configured to supply a fuel gas to the fuel cell stack;
an oxygen-containing gas supply pipe configured to supply an oxygen-containing gas to the fuel cell stack;
a gas liquid separator provided at least in one of the fuel gas supply pipe and the oxygen-containing gas supply pipe;
a temperature sensor configured to obtain a correlation temperature correlated to a temperature of the fuel cell stack;
a heater provided at a bottom of a water storage area of the gas liquid separator; and
one or more processors configured to estimate a temperature of the heater,
the method comprising the step of determining presence/absence of water in the gas liquid separator based on the correlation temperature of the fuel cell stack and the temperature of the heater.

* * * * *